US009881419B1

(12) United States Patent
Côté et al.

(10) Patent No.: US 9,881,419 B1
(45) Date of Patent: Jan. 30, 2018

(54) TECHNIQUE FOR PROVIDING AN INITIAL POSE FOR A 3-D MODEL

(75) Inventors: Stéphane Côté, Lac Beauport (CA); Stéphane Poirier, Quebec (CA)

(73) Assignee: Bentley Systems, Incorporated, Exton, PA (US)

( * ) Notice: Subject to any disclaimer, the term of this patent is extended or adjusted under 35 U.S.C. 154(b) by 860 days.

(21) Appl. No.: 13/364,846

(22) Filed: Feb. 2, 2012

(51) Int. Cl.
*G06T 19/00* (2011.01)

(52) U.S. Cl.
CPC .................... *G06T 19/00* (2013.01)

(58) Field of Classification Search
CPC ....... G06T 19/006; G06T 11/60; G06T 13/00; G06T 19/00; G06T 2200/24; G06F 17/50; G06Q 10/10; G06Q 30/02
USPC .......................................................... 345/633
See application file for complete search history.

(56) References Cited

U.S. PATENT DOCUMENTS

| | | | | |
|---|---|---|---|---|
| 6,097,393 A | * | 8/2000 | Prouty, IV | .......... G06F 3/04815 345/419 |
| 8,869,058 B1 | | 10/2014 | De et al. | |
| 2005/0168486 A1 | * | 8/2005 | Sato | ......................... A63F 13/10 345/633 |
| 2006/0029271 A1 | * | 2/2006 | Miyoshi | ..................... G06T 3/00 382/154 |
| 2006/0265664 A1 | * | 11/2006 | Simons | .................. A62B 99/00 715/772 |
| 2007/0018975 A1 | * | 1/2007 | Chuanggui et al. | .......... 345/419 |
| 2007/0141526 A1 | * | 6/2007 | Eisenberg et al. | .............. 433/24 |
| 2009/0245691 A1 | | 10/2009 | Naimark et al. | |
| 2010/0232727 A1 | | 9/2010 | Engedal | |
| 2011/0058187 A1 | | 3/2011 | Smith et al. | |
| 2012/0033032 A1 | * | 2/2012 | Kankainen | ......... G01C 21/3647 348/36 |

* cited by examiner

*Primary Examiner* — Haixia Du
(74) *Attorney, Agent, or Firm* — Cesari and McKenna, LLP; James A. Blanchette (57) ABSTRACT

In one embodiment, augmented reality is facilitated by a special initialization user interface that shows multiple views of a three-dimensional (3-D) model and a representation of a physical environment captured by a camera, where each of the multiple views is updated substantially in real-time as changes are made in another of the multiple views. An approximate lateral position of the representation of the physical environment with respect to the 3-D model is received through user interaction with a first of the views. An approximate orientation of the representation of the physical environment with respect to the 3-D model is received through user interaction with a second of the views. Correspondence is established between a plurality of portions of the 3-D model and a plurality of portions of the representation of the physical environment to anchor the 3-D model to the representation of the physical environment.

21 Claims, 11 Drawing Sheets

FIG. 1

Prior Art

TECHNIQUE FOR PROVIDING AN INITIAL POSE FOR A 3-D MODEL

BACKGROUND

Technical Field

The present disclosure relates to initialization of an augmented reality system, and more specifically, to techniques for establishing a corresponance between a 3-D model and the physical environment being augmented.

Background Information

Augmented reality is a technology in which a view of a physical environment is augmented by computer-generated graphics, text or other information (hereinafter "computer-generated features"), which are overlaid upon the view of the physical environment (i.e. a real-life environment) to appear as if they are part of the scene. The view of the physical environment being augmented may be a static view (e.g., a still image) or a dynamic view (e.g., a full-motion video). In contrast to virtual reality, where a simulated environment is shown to a user rather than a view of a physical environment, augmented reality blends the virtual with the real to enhance a user's perception of the physical environment.

The computer-generated features overlaid in augmented reality are typically derived from a three-dimensional (3-D) model that corresponds to the physical environment being augmented. Elements of the 3-D model have a position in a 3-D space of the model. The position in the 3-D space of the model relates to a position within the physical environment being augmented. To create an augmented reality view, a view of the physical environment is captured from a particular position, facing in a particular orientation. The 3-D model is queried, and it is determined which elements of the 3-D model would be visible from a corresponding position in the 3-D space of the model, if facing in a corresponding orientation. The visible elements are used to produce computer-generated features that are overlaid upon the view of the physical environment. In this manner, an augmented reality view is created that blends the real and the virtual.

Figure 1:
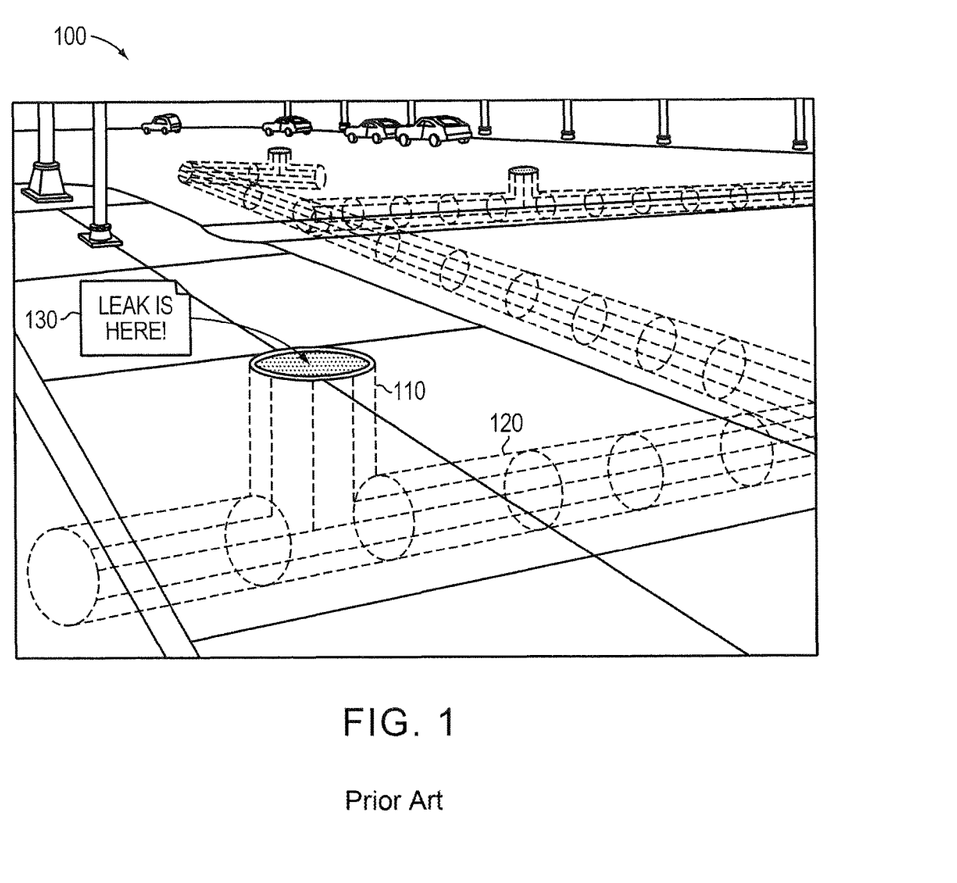
FIG. 1 is an example augmented reality view of a street, in which computer-generated features are overlaid upon a view of an actual street.

FIG. 1 is an example augmented reality view 100 of a street, in which computer-generated features are overlaid upon a view of the actual street. In this example, computer-generated graphics depicting the underground portions of a manhole 110 and a pipe 120 are overlaid upon a view of the street captured by a camera. The computer-generated graphics allow a user to observe portions of the waste water management system that are not visible from the surface of the street, so the user may better understand the layout of the system. Further, computer-generated text 130 calling out important information related to the waste water management system is overlaid upon the view of the physical street. The computer-generated text may provide the user with information that is not apparent by simple visual inspection of the street. While the example augmented reality view 100 is a static view, e.g. a still image, it should be understood that such techniques may be readily employed in with a dynamic view, e.g., a full-motion video. In such a dynamic view the location and appearance of the overlaid portions of a manhole 110, pipe 120 and text 130 may be updated on a frame-by-frame basis to coincide with changes in perspective, for example, as the camera is moved.

Many augmented reality techniques require initialization before they may be used to provide an augmented reality view. As part of the initialization the 3-D model is "anchored" to a representation of the physical environment, for example, by having the user manually or semi-manually define correspondence. However, manually or semi-manually defining correspondence may be time consuming and frustrating using existing techniques. A user may have difficulty manually or semi-manually define correspondence when portions of the 3-D model and the representation of the physical environment are displayed to the user from different points of view, such that they are substantially unaligned. In such cases, a user may readily become confused by the information they are being shown, and be unable to select portions that coincide with one another.

What is needed is a technique that simplifies initialization of an augmented reality system, to permit a user to more easily and quickly define correspondence between a 3-D model and a representation of the physical environment.

SUMMARY

In one embodiment, the shortcomings of the prior art are addressed by a special initialization user-interface that permits a user to rapidly define correspondence. The initialization user-interface simultaneously displays multiple views of a 3-D model and a representation of the physical environment (e.g., a panorama of the physical environment) captured by a camera. The multiple views include a top-down view that depicts the 3-D model and the representation of the physical environment from above, and a first-person view that depicts the 3-D model and the representation of the physical environment from a viewpoint immersed within the scene. Through an interactive process, a user substantially aligns the 3-D model and the representation of the physical environment (e.g., the panorama), based on the feedback from the multiple views. The user then defines correspondence between portions of (e.g., points in) the 3-D model and portions of (e.g., points in) the representation of the physical environment (e.g., the panorama) to anchor the model to the representation of the physical environment.

In the top-down view, the representation of the physical environment (e.g., the panorama) is shown as a projection from above, superimposed on a projection from above of the 3-D model. In the first-person view, the representation of the physical environment (e.g., the panorama) is shown as an image from a selected position, over which a semitransparent (e.g., a wire frame) depiction of the 3-D model is superimposed. To align the 3-D model and the representation of the physical environment (e.g., the panorama), the user first adjusts (e.g., drags) the projection of the panorama within the top-down view to an approximate lateral position with respect to the 3-D model. The first-person view is updated in substantially real-time as the lateral position is changed. The user may use visual feedback provided by enlargements shown in the top-down view, and from visual feedback provided by the first-person view in determining the approximate lateral position. After the approximate lateral position has been defined, an approximate orientation of the representation of the physical environment (e.g., the panorama) with respect to the 3-D model is defined. In some implementations, the user may manually define the approximate orientation, adjusting (e.g., dragging) the 3-D model within the first-person view to rotate it until an acceptably accurate orientation has been established.

As the user drags the 3-D model, the top-down view is updated in substantially real-time. Markings on the projection of the panorama in the top-down view may indicate the field of view being shown in the first-person view, providing an additional source of visual feedback to the user. An approximate altitude of the 3-D model with respect to the representation of the physical environment (e.g., the panorama) is as also defined. In some implementations, the user may manually define the approximate altitude, adjusting (dragging) the 3-D model up or down within the first-person view to choose an acceptable altitude.

After an approximate lateral position, orientation, and altitude are defined, the 3-D model and the representation of the physical environment (e.g., the panorama) should be substantially aligned, such that portions of (e.g., points in) the 3-D model and portions of (e.g., points in) the representation of the physical environment are located fairly proximate to one another in the first-person view. The user defines correspondence between portions of the 3-D model and portions of the representation of the physical environment by sequentially selecting portions of the 3-D model and selecting corresponding portions in the representation of the physical environment in the first-person view. Once this has been done for a number of points, the model may be effectively anchored to the representation of the physical environment (e.g., the panorama), and initialization completed.

BRIEF DESCRIPTION OF THE DRAWINGS

The detailed description below refers to the accompanying drawings of example embodiments, of which.

DETAILED DESCRIPTION

Figure 2:
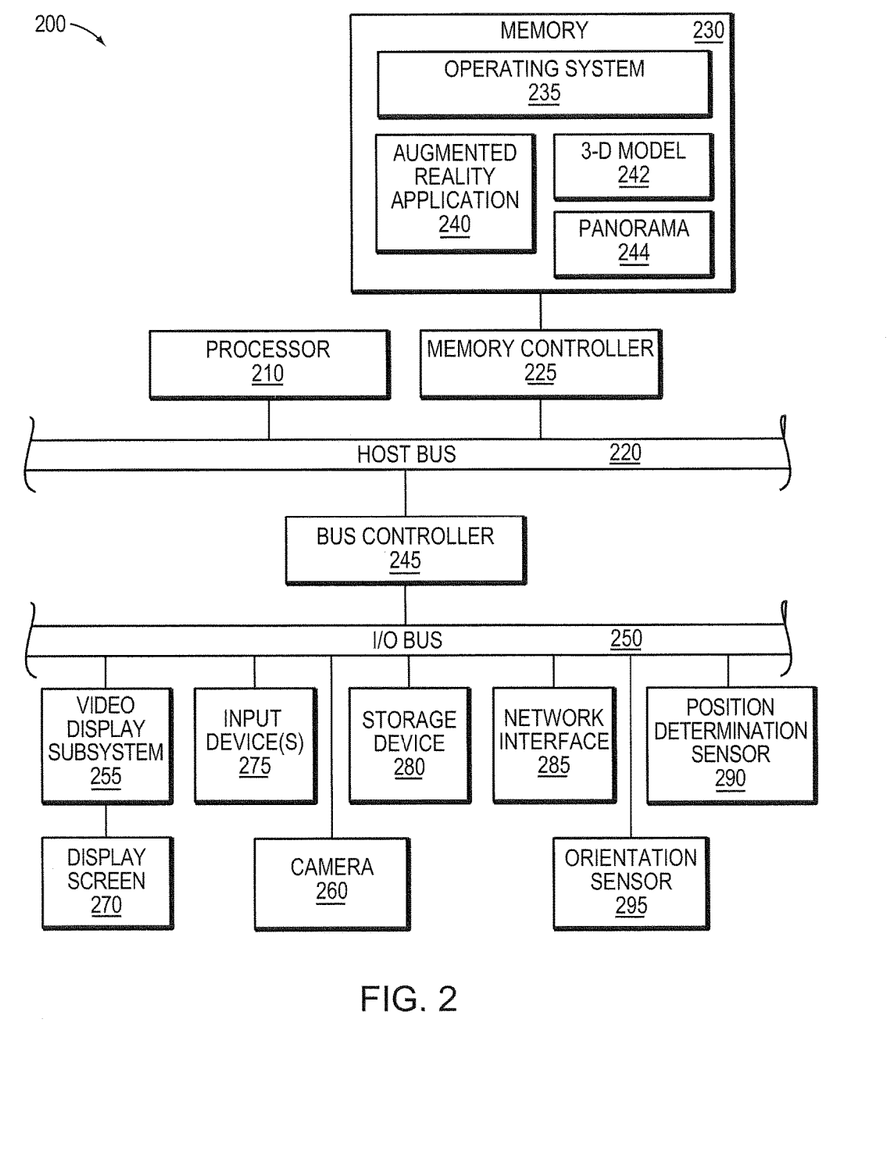
FIG. 2 is a block diagram of an example electronic device, in which at least some of the presently described techniques may be employed.

FIG. 2 is a block diagram of an example electronic device 200, in which at least some of the presently described techniques may be employed. The electronic device may be a portable electronic device, for example, a tablet computer, an ultra-mobile personal computer (UMPC), a smartphone, or another type of mobile computing device that may be readily transported by a user about the physical environment. The electronic device 200 includes at least one processor 210 coupled to a host bus 220. The processor 210 may be any of a variety of commercially available processors, such as an Intel x86 processor, or another type of processor. A volatile memory 230, such as a Random Access Memory (RAM), is coupled to the host bus 220 via a memory controller 225. The memory 230 is configured to store at least a portion of computer-executable instructions and data for an operating system 235 while the electronic device 200 is operating. In addition, the memory 230 may store at least portions of an augmented reality application 240, which is adapted to overlay computer-generated features (e.g., computer-generated graphics, text or other information) upon a view of the physical environment. The computer-generated features may be produced from elements of a three-dimensional (3-D) model 242 that corresponds to the physical environment. The 3-D model 242 may be a computer aided design (CAD) model created and/or maintained by a CAD software platform (not shown), for example, the MicroStation® V8i CAD software platform. As discussed in more detail below, the augmented reality application 240 may utilize a panorama 244 captured from the physical environment to initialize augmented reality functionality. The panorama 244 may be stored in memory 230 along with the 3-D model 242.

The host bus 220 of the electronic device 200 is coupled to an input/output (I/O) bus 250 through a bus controller 245. A persistent storage device 280, such as a hard disk drive, a solid-state drive, or another type or persistent data store, is coupled to the I/O bus 250, and may persistently store computer-executable instructions and data, that are available to be loaded to the volatile memory 230 when needed. A camera 260 (e.g., a video camera or a still camera) may be coupled to the I/O bus 250 and configured capture a view (e.g., a static view or a dynamic view) of the physical environment proximate to the electronic device. A video display subsystem 255 that includes a display screen 270 may also be coupled to the I/O bus 250. The augmented reality application 240, after initialization using the panorama 244, may manipulate a live view captured by the camera 260 to overlay appropriate computer-generated features derived from the 3-D model 242 to create an augmented reality view, and display this augmented reality view in a user interface of the augmented reality application 240 shown on the display screen 270. Alternatively, the augmented reality application 240, after initialization using the panorama 244, may manipulate a portion of the panorama 244 (a static view) that corresponds to the orientation of the electronic device 200, to overlay appropriate computer-generated features derived from the 3-D model 242 on the portion of the panorama to create an augmented view. Augmenting a portion of the panorama 244 offer many of the advantages of augmenting a live view captured by the camera 260, while avoiding certain difficult processing tasks.

One or more input devices 275, such as a touch sensor incorporated into the display screen 270, a touchpad, a keyboard, a mouse, a trackball, etc. may be provided and used for interacting with the augmented reality application 240 and other software executing on the electronic device 200. Further, the I/O bus 250 may be coupled to a network interface 285 (e.g., a wireless interface or a wired interface) that interfaces with a computer network (not shown). The computer network may allow communication between the electronic device 200 and other devices, using any of a number of well known networking protocols. Such communication may enable a variety of collaborative, distributed, and/or remote computing configurations.

In some implementations, the I/O bus 250 may be coupled to a position determination sensor 290, for example, a global positioning system (GPS) receiver. The position determination sensor 290 may return an estimate of the position for the electronic device 290 (and by implication the camera 260). Further, in some implementations, the I/O bus 250 may be coupled to an orientation sensor 295 that may return an estimate of the orientation for the electronic device 200 (and by implication the camera 260).

In some systems, augmented reality may be limited to fixed positions. In fixed-position augmented reality, a user selects a position within the physical environment from which he or she desires to see an augmented reality view of the surroundings. The user initializes augmented reality for this selected position by anchoring a 3-D model to a representation of the physical environment, and thereafter may obtain an augmented reality view in any orientation from this position. However, the user typically may not change the position after this, absent performing a re-initialization. Should the user desire an augmented reality view from a different position, the user may select the new position, initialize augmented reality for the new selected position by anchoring a 3-D model to a representation of the physical environment as seen from nearby that position, and thereafter may obtain an augmented reality view in any orientation from the new selected position.

From any particular fixed-position, the visible physical environment is limited. As such, the visible physical environment may be represented as a panorama, i.e. an image that represents objects in a 360-degree field of view along a substantially horizontal plane. When a user selects a position within the physical environment from which he or she desires to see an augmented reality view, a panorama may be captured that corresponds to that position. When augmented reality is initialized for the selected position, the 3-D model is anchored to the panorama, such that correspondence is defined between portions of (e.g., points in) the 3-D model and portions of (e.g., points in) that panorama.

Figure 3:
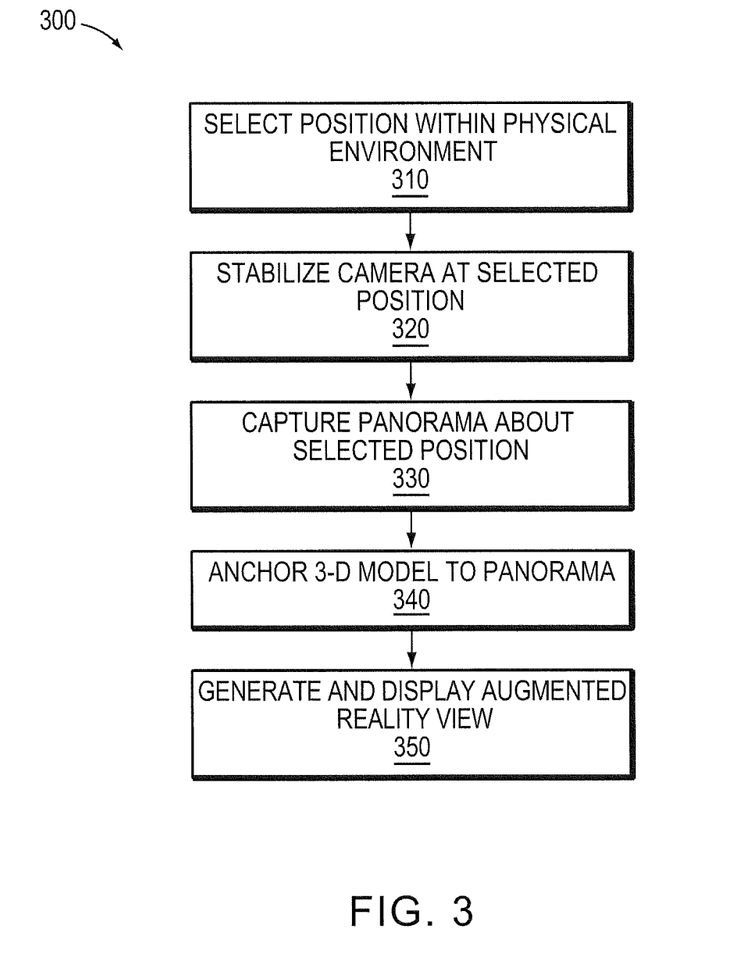
FIG. 3 is a flow diagram showing an example sequence steps for implementing fixed-position augmented reality.

FIG. 3 is a flow diagram showing an example sequence steps 300 for implementing fixed-position augmented reality. At step 310, a user selects a position within the physical environment from which he or she desires to see an augmented reality view of the surroundings. At step 320, the user stabilizes the electronic device 200, and thereby the camera 260, at the selected position. For example, the user may install a tripod at the selected position and mount the electronic device 200 to the tripod. The tripod may allow free rotation of the electronic device 200, while substantially preventing lateral movement. At step 330, the user uses the electronic device 200 to capture a panorama 244 about the selected position. For example, the user may activate the augmented reality application 240 executing on the electronic device 200, initiate a panorama capture mode, and then rotate the electronic device 200, and thereby the camera 260, on the tripod to capture views of the physical environment in all orientations along a substantially horizontal plane. At step 340, the user initializes augmented reality by anchoring a 3-D model 242 to the newly captured panorama 244. To anchor the 3-D model to the panorama, the user manually or semi-manually defines correspondence. For example, the user may sequentially select a portion of (e.g., a point in) the 3-D model 242 and a corresponding portion of (e.g., point in) the panorama 244 and indicate they correspond using an input device 275, e.g., by clicking a mouse, touching upon a touch screen, etc. This may be repeated a number of times for different portions of the 3-D model and the panorama, to anchor the model to the panorama. At step 350, once the 3-D model 242 is anchored to the panorama 244, an augmented reality view may be generated and displayed by augmented reality application 240. The augmented reality view may be a static view (e.g., a still image), or a dynamic view (e.g., full-motion view).

As discussed above, initializing augmented reality manually or semi-manually may be time consuming and frustrating when the portions of the 3-D model 242 and the representation of the physical environment are substantially unaligned. A user may be confronted with a complex arrangement of elements of the 3-D model as they appear from a first view point. The user may also be confronted by a complex arrangement of objects in the panorama as they appear from a second, different view point. Finding points that correspond between the two may be a challenge.

According to one embodiment of the present disclosure, a special initialization user-interface is provided by the augmented reality application 240. The initialization user-interface simultaneously displays multiple views of the 3-D model 242 and the panorama 244, including a top-down view that depicts the 3-D model and the panorama from above, and a first-person view that depicts the 3-D model and the panorama from a viewpoint immersed within the scene. Through an interactive process, a user may use feedback from the multiple views to substantially align the 3-D model 242 and the panorama 244, and then establish correspondence between portions of (e.g., points in) the 3-D model 242 and portions of (e.g., points in) the panorama to anchor the model to the panorama.

In the top-down view, a projection of the panorama 244 is shown superimposed on a projection of the 3-D model 242. In the first-person view, the panorama 244 is shown as an image from the selected position, over which a semi-transparent (e.g. a wire frame) depiction of the 3-D model is superimposed. To align the 3-D model and the panorama, the user first adjusts (e.g., drags) the projection of the panorama within the top-down view to an approximate lateral position with respect to the 3-D model. The first-person view is updated in substantially real-time as the lateral position is changed. The user may use visual feedback provided by enlargements shown in the top-down view and from visual feedback provided by the first-person view in determining the approximate lateral position. After the approximate lateral position has been defined, an approximate orientation of the panorama with respect to the 3-D model is defined. In some implementations, the user may manually define the approximate orientation, adjusting (e.g., dragging) the 3-D model within the first-person view to rotate it until an acceptably accurate orientation has been established. As the user drags the 3-D model, the top-down view is updated in substantially real-time. Markings on the top-down view may indicate the field of view being shown in the first-person view, providing an additional source of visual feedback to the user. Further, an approximate altitude of the 3-D model with respect to panorama is defined. In some implementations, the user manually defines the approximate altitude, adjusting (dragging) the 3-D model up or down within the first-person view to choose an acceptable altitude.

After an approximate lateral position, orientation, and altitude are defined, the 3-D model and the panorama should be substantially aligned, such that portions of (e.g., points in) the 3-D model and portions of (e.g., points in) the panorama are located fairly proximate to one another in the first-person view. The initialization user-interface may then be used by the user to define correspondence. The user may sequentially select portions of (e.g., points in) the 3-D model and corresponding portions of (e.g., points in) the panorama in the first-person view and indicate they correspond. Once this has been done for a number of points, the model is anchored to the panorama, and initialization completed.

Figure 4:
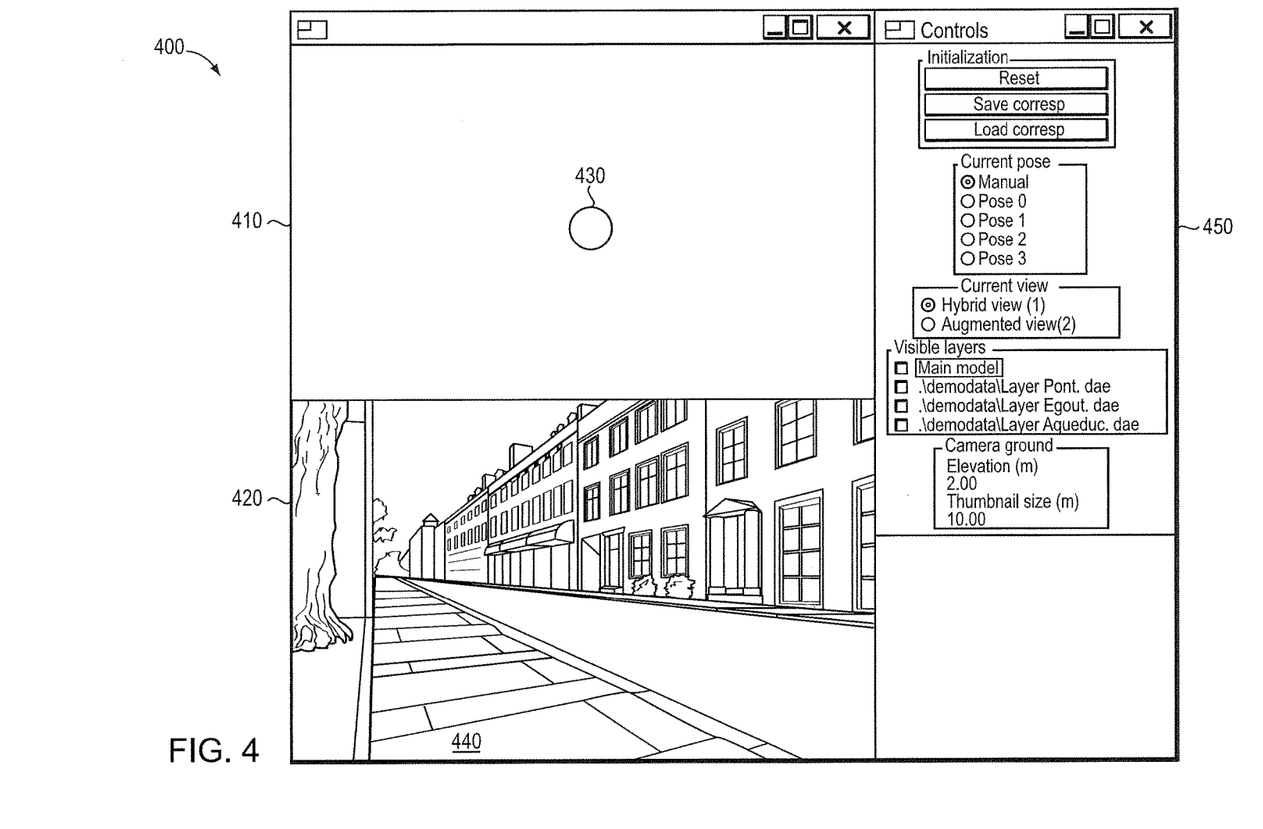
FIG. 4 is a screen shot of an example initialization user-interface of an augmented reality application that provides at least a top-down view and a first-person view.

FIG. 4 is a screen shot 400 of an example initialization user-interface of the augmented reality application 240 that provides a top-down view 410 and a first-person view 420. A user may manipulate controls 450 to load a captured panorama of the physical environment, to cause it to be displayed in both the top-view 410 and the first-person view 420. The panorama is shown in the top-view 410 as a projection 430 from above, and in the first-person view 420 as an image 440 as seen from the selected position. The user may manipulate controls 450 to load a 3-D model that corresponds to the portion of the physical environment represented in the panorama.

Figure 5:
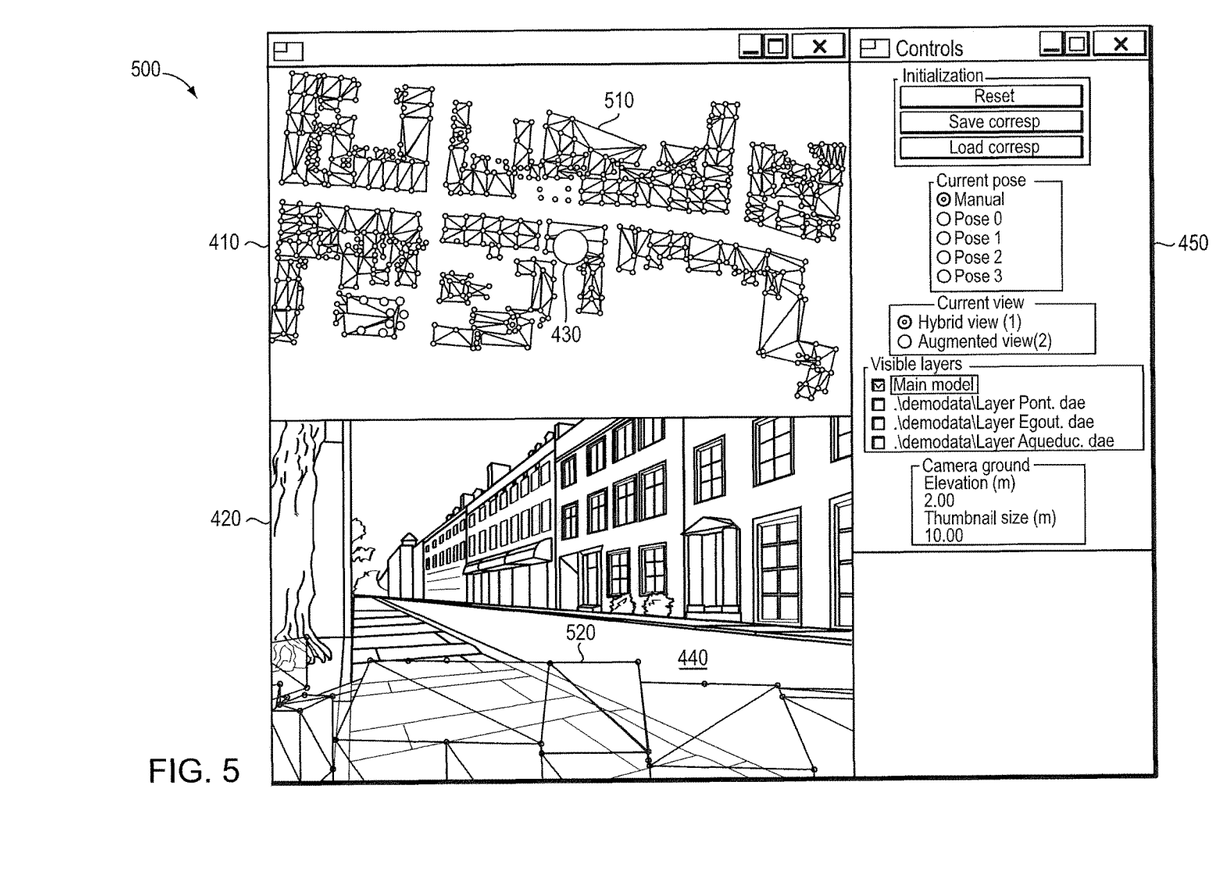
FIG. 5 is an additional screen shot of the example initialization user-interface showing a 3-D model.

FIG. 5 is an additional screen shot 500 of the example initialization user-interface showing the 3-D model. In the top-view 410, the 3-D model is displayed as a projection 510 from above, with the projection of the panorama 430 superimposed thereupon. In the first-person view 420, the 3-D model is displayed as a semitransparent (e.g., a wire frame) depiction 520 upon the image 440 as seen from the selected position.

An approximate lateral position of the panorama with respect to the 3-D model is defined. In one implementation, this is performed manually by the user. The user may select (e.g., click on) the projection of the panorama 430 with an input device 275 within the top-down view 410, and adjust (e.g., drag) the projection 430 within the top-down view 410 to an approximate lateral position.

Figure 6:
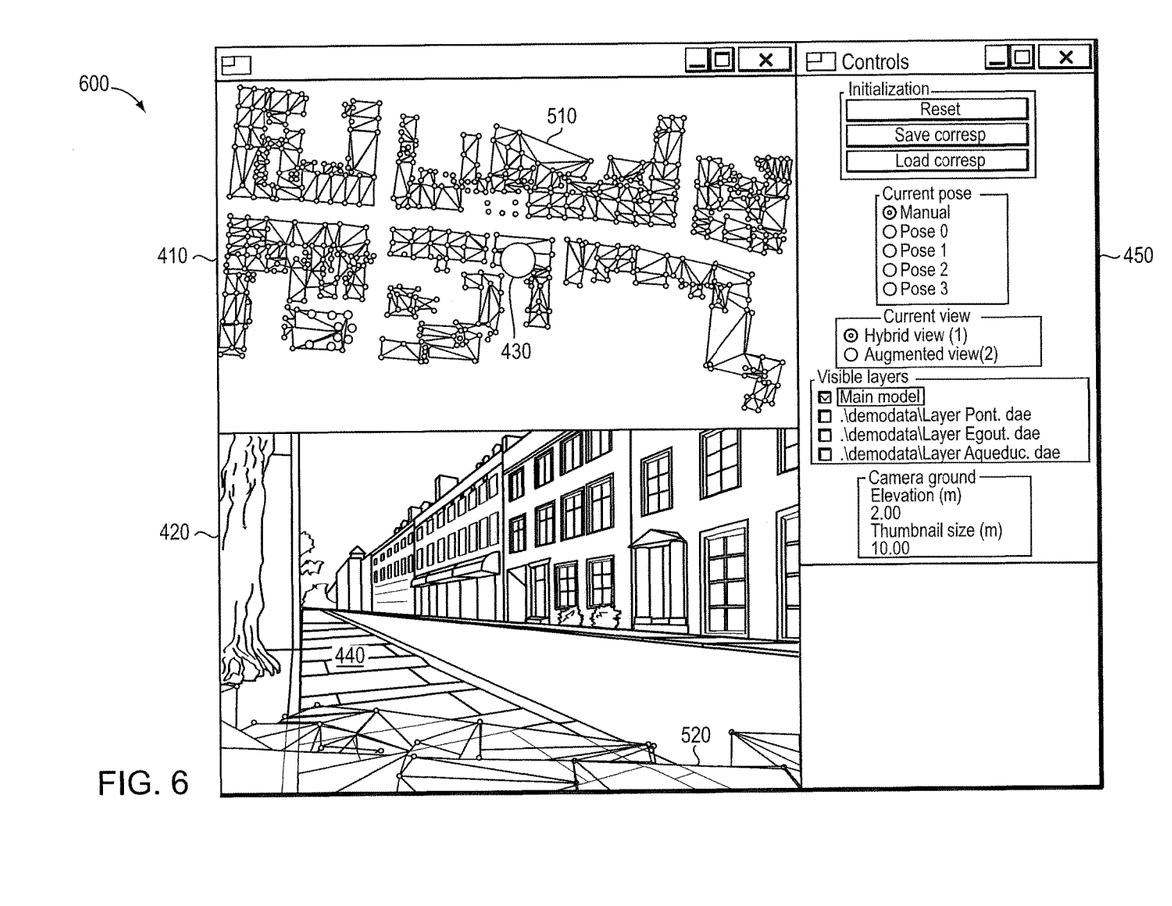
FIG. 6 is an additional screen shot of the example initialization user-interface showing the 3-D model adjusted to a different lateral position.

FIG. 6 is an additional screen shot 600 of the example initialization user-interface showing the 3-D model adjusted to a different lateral position with respect to the panorama. As can be seen, the appearance of the 3-D model in the first-person view is updated to reflect the new lateral position. The user is provided with two forms of visual feedback while this adjustment is being made: the visual appearance of the projection of the panorama 430 in the top-down view 410 with respect to the projection of the 3-D model 510, and the visual appearance of the 3-D model in the first person view 440 with respect to the image. As discussed in more detail below, the user may zoom in on the projection of the panorama 430 in the top-down view 410 to observe more detail, and position the panorama more accurately.

In certain alternative implementations, an approximate lateral position of the panorama with respect to the 3-D model may be defined in other manners, with at least some position information coming from a source other than the user. For example, the position determination sensor 290 (GPS receiver) of the electronic device 200 may return an indication of the lateral position. This indication may be used directly, or serve as a starting point to which manual adjustment of lateral position may be applied, using the above discussed techniques, to derive a more accurate lateral position.

Figure 7:
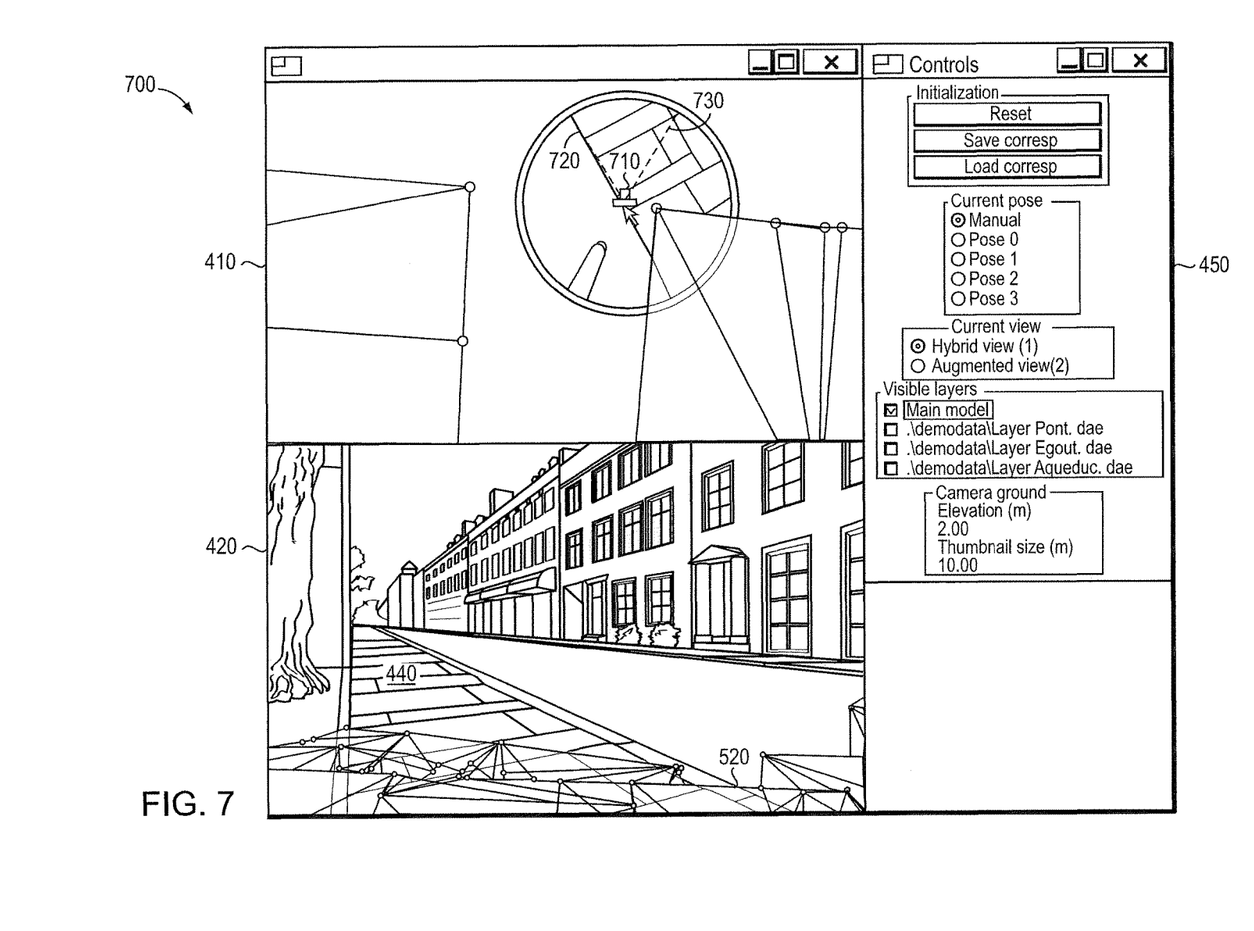
FIG. 7 is an additional screen shot of the example initialization user-interface showing an enlargement within the top-down view, which may be used in conjunction with the first-person view when defining the approximate orientation.

An approximate orientation of the panorama with respect to the 3-D model is also defined. In one implementation, this is performed manually by the user. FIG. 7 is an additional screen shot 700 of the example initialization user-interface showing an enlargement of the projection of the panorama 430 within the top-down view 410, which may be used in conjunction with the first-person view 420 when defining the approximate orientation of the panorama with respect to the 3-D model. The user may select (e.g., click on) the semitransparent depiction 520 of the 3-D model in the first-person view 420 with an input device 275 and adjust (e.g., drag) it left or right to adjust orientation. Alternatively, the user may define the approximate orientation by pressing left or right arrow buttons, or interacting with other types of input devices 275. The orientation adjustments may be reflected in substantially real-time in the top-down view 410.

Figure 8:
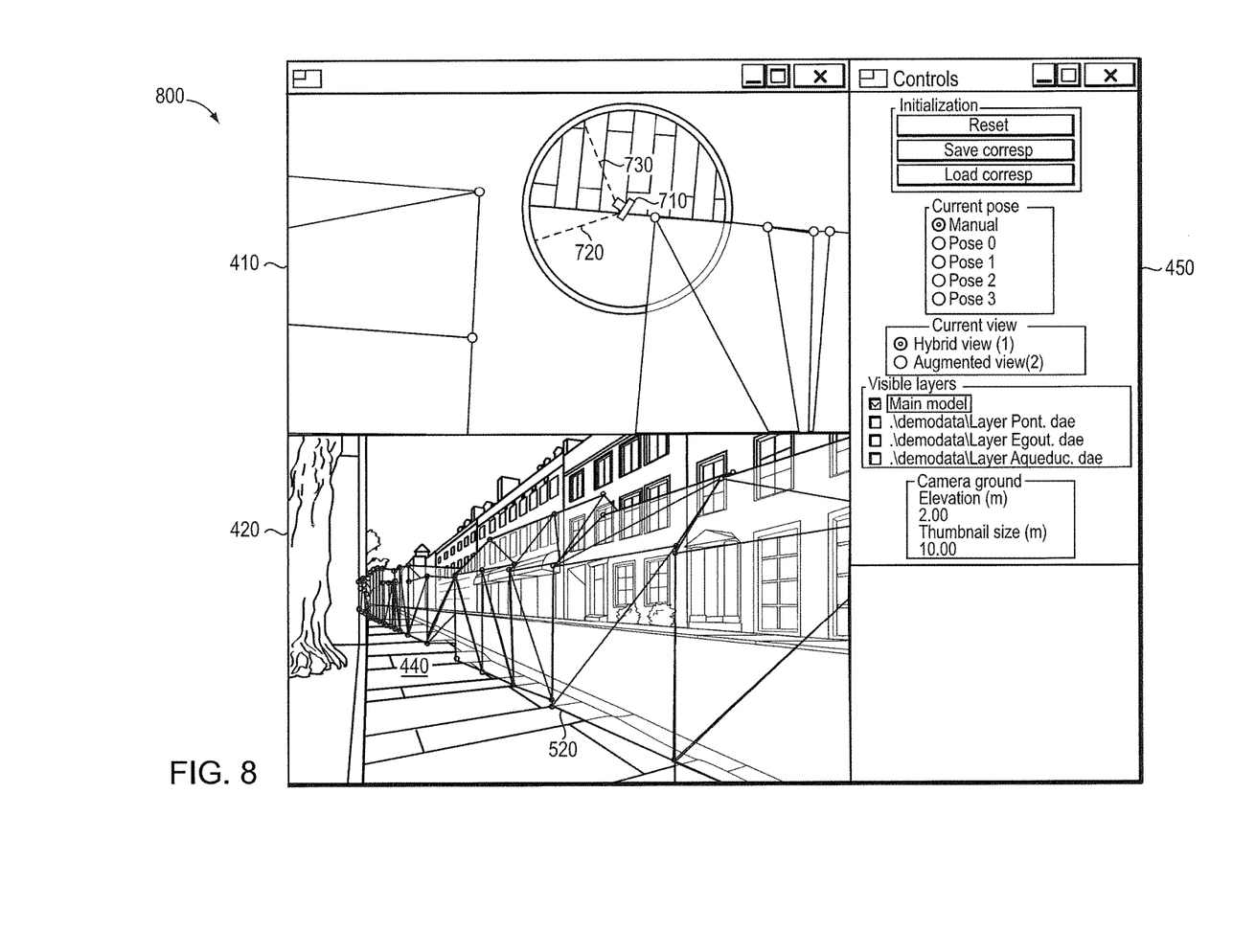
FIG. 8 is an additional screen shot of the example initialization user-interface showing the effects of rotation.
Figure 9:
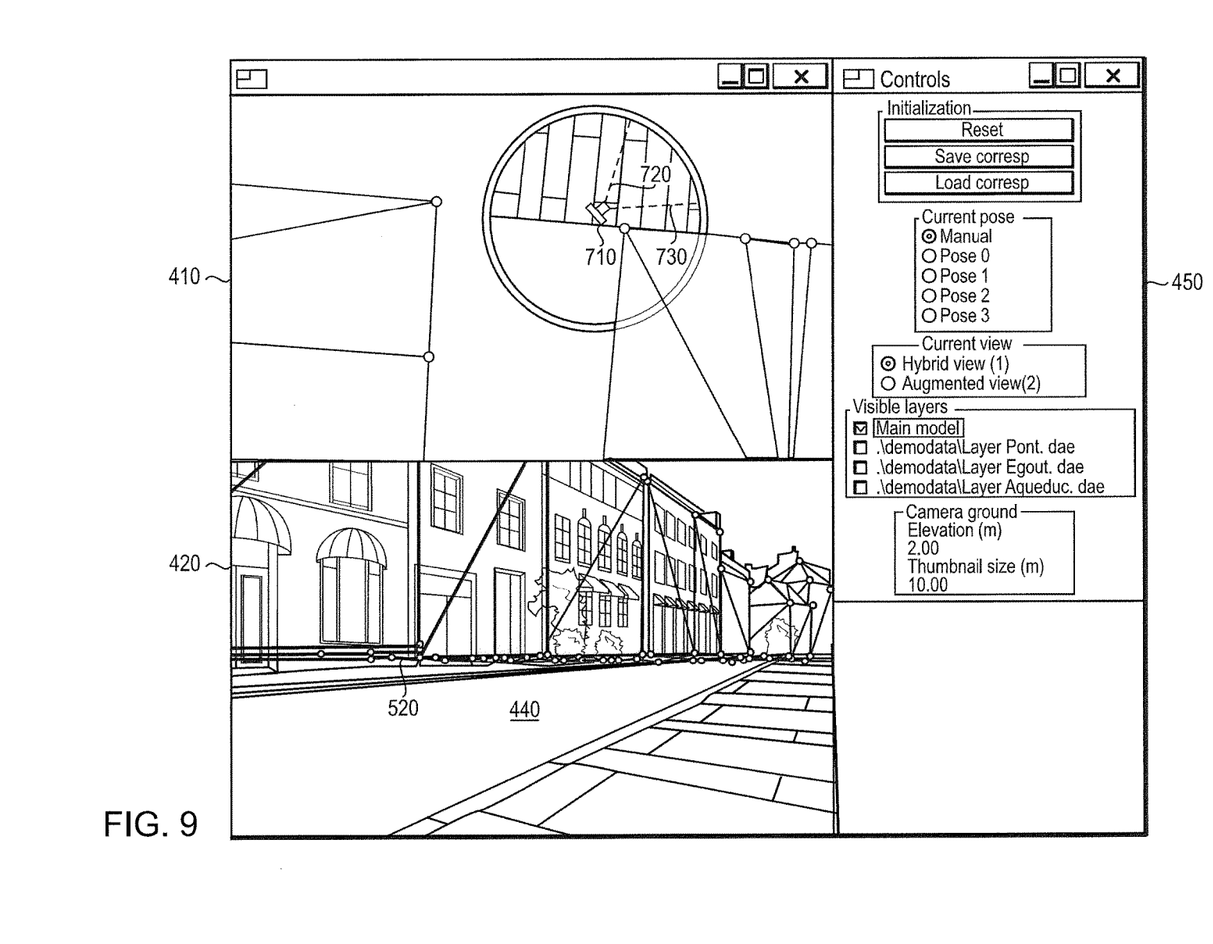
FIG. 9 is an additional screen shot of the example initialization user-interface showing further effects of rotation and effects of increasing height of the 3-D model with respect to the panorama.

FIG. 8 is an additional screen shot 800 of the example initialization user-interface showing the panorama rotated with respect to the 3-D model, approaching alignment with the 3-D model. FIG. 9 is an additional screen shot 800 of the example initialization user-interface showing the panorama rotated with respect to the 3-D model and effects of increasing height of the 3-D model with respect to the panorama, so that the 3-D model and the panorama approach alignment.

When enlargement of the projection of the panorama 430 is shown in the top down view, a camera icon 710 may be shown in the center of the projection 430 and markings (e.g., colored line) 720, 730 extending from the camera icon 710 may indicate the field of view corresponding to the image shown in the first-person view 420. The visual feedback provided by the first-person view 420, and the indicated field of view in the top-down view 410, again provides the user with two forms of visual feedback when defining an approximate orientation.

In certain alternative implementations, an approximate orientation of the panorama with respect to the 3-D model may be defined in other manners, with at least some position information coming from a source other than the user. For example, the orientation sensor 295 of the electronic device 200, a separate electronic compass, or other orientation measurement device, may return an indication of the orientation. This indication may be used directly, or serve as a starting point to which manual adjustment of orientation may be applied, using the above discussed techniques.

An approximate altitude of the 3-D model with respect to the panorama is also defined. In one implementation, this is performed manually by the user. Referring to FIG. 9, similar to defining orientation, the user may manually define the approximate altitude, by selecting (e.g., clicking on) the semitransparent depiction 520 of the 3-D model in the first-person view 420 with the input device 275 and adjust (e.g., drag) it up or down to adjust altitude. Alternatively, the user may define the approximate altitude by pressing up or down arrow buttons, or interacting with other types of input devices 275. Furthermore, in alternative implementations, an approximate altitude of the 3-D model with respect to the panorama may be defined in other manners, with at least some position information coming from a source other than the user, similar to as described above for lateral position and orientation.

Figure 10:
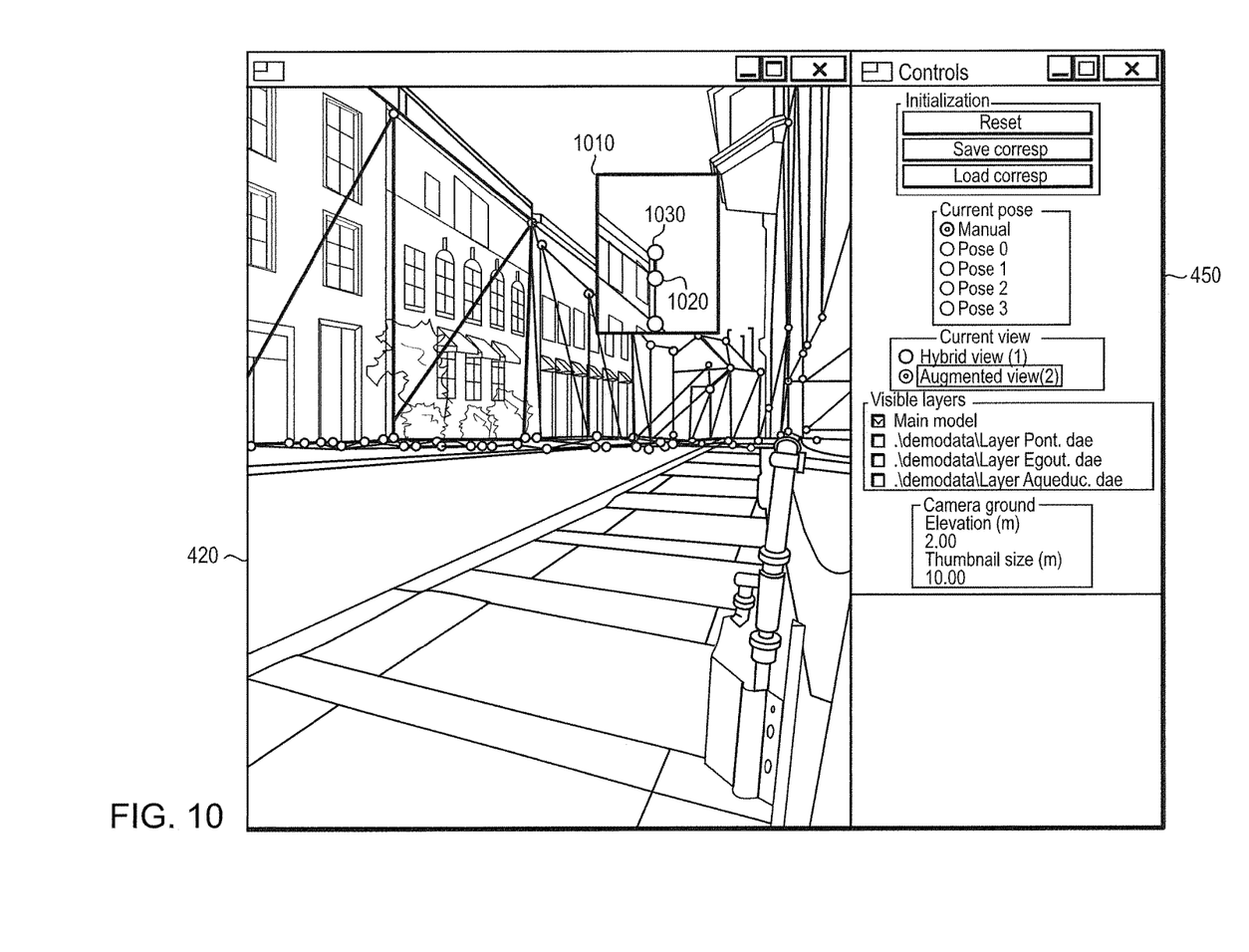
FIG. 10 is an additional screen shot of the example initialization user-interface showing correspondence being defined.

After an approximate lateral position, orientation, and altitude are defined, the 3-D model and the panorama should be substantially aligned, and the user defines correspondence. FIG. 10 is an additional screen shot 1000 of the example initialization user-interface showing correspondence being defined between portions of (e.g., points in) the 3-D model and portions of (e.g., points in) the panorama in an enlarged first-person view 420. Even further enlargement may by provided by a movable enlargement window 1010 that zooms in upon a part of the first-person view 420. To define correspondence, the user may select (e.g., click on) a portion 1020 of (e.g., a point in) the semitransparent depiction 520 of the 3-D model with an input device 275, hold, drag to a selected portion 1030 of (e.g., a point in) the panorama that corresponds, and release. Since the 3-D model and the panorama are already substantially aligned, the selections may be performed rapidly by the user, with a minimum of frustration. Once this has been done for a number of points, the 3-D model is anchored to the panorama, and initialization completed.

Figure 11:
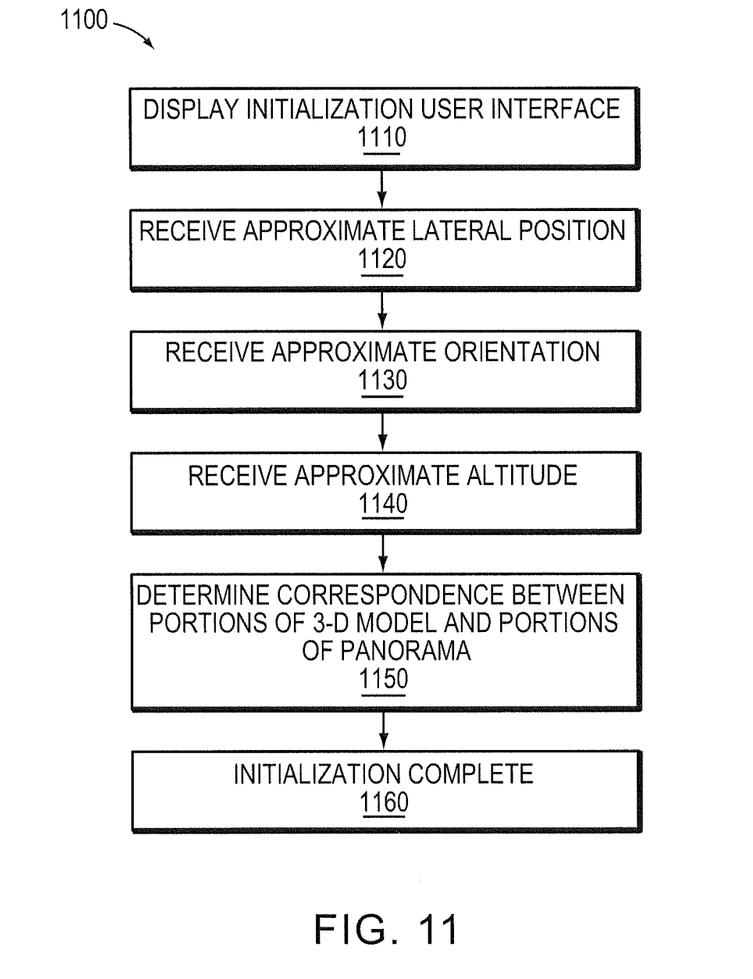
FIG. 11 is a flow diagram showing an example sequence steps for defining correspondence.

FIG. 11 is a flow diagram showing an example sequence steps 1100 for defining correspondence between a 3-D model and a panorama. While the sequence of steps 1100 shows lateral position, orientation, and altitude each being defined manually by the user, it should be understood that one or more of these qualities may be defined in other manners, with at least some information coming from a source other than the user (e.g., from a sensor). At step 1110, the electronic device 200 displays the initialization user interface of the augmented reality application on the display screen 270, the initialization user-interface including at least a top-down view that depicts the 3-D model and the representation of the physical environment from above, and a first-person view that depicts the 3-D model and the representation of the physical environment from a viewpoint immersed within the representation of the physical environment. At step 1120, an approximate lateral position of the panorama with respect to the 3-D model is received from the user. For example, the user may adjust (e.g., drag) the projection of the panorama 430 within the top-down view to an approximate lateral position with respect to the projection of the 3-D model 510. At step 1130, an approximate orientation of the panorama with respect to the 3-D model is received from the user. For example, the user may adjust (e.g., drag) the 3-D model left or right within the first-person view to rotate it until an acceptably accurate orientation has been established. At step 1140, an approximate altitude of the 3-D model with respect to the panorama is received from the user. For example, the user may adjust (e.g., drag) the 3-D model up or down within the first-person view until an acceptably accurate altitude has been established. At step 1150, correspondence is determined between a plurality of portions of the 3-D model and a plurality of corresponding portions of the panorama to anchor the 3-D model to the panorama. For example, in the first person view 410, the user may select (e.g., click on) a portion 1020 of (e.g., a point in) of the 3-D model, hold, drag to a corresponding portion of (e.g., a point in) 1030 the panorama, and release, repeating this process a number of times. The receipt of these selections may determine the correspondence. At step 1160, initialization is completed.

While the above description discusses various embodiments of the present disclosure, it should be apparent that a number of modifications and/or additions may be made without departing from the disclosure's intended spirit and scope. While it is discussed above that the camera 260, the augmented reality application 240 and the 3-D model 242 may all be resident on the electronic device 200, in alternative embodiments, these components may be distributed among two or more electronic devices. For example, the camera 260 may be resident on a first electronic device (e.g., a tablet computer) used to capture views of the physical environment, while at least portions of the augmented reality application 240 and the 3-D model 242 may be resident on a second electronic device (e.g., a desktop computer) used to initialize augmented reality. The display screen 270 that shows an augmented reality view may be a portion of the first electronic device, the second electronic device, or yet another electronic device. Accordingly, it should be understood that the above techniques may be applicable to a variety of different hardware configurations, including any of a number of differently arranged distributed configurations.

Further, while it is discussed above that a touch senor, touchpad, keyboard, trackball, etc. of the electronic device 200 may be used as the primary input device 275 for interacting with the panorama and 3-D model within the top-down view 410 and the first-person view 430, in alternative embodiments the orientation sensor 295 may be used to provide at least some input. The orientation of the electronic device 200, as measured by the orientation sensor 295, may be used to adjust the position and orientation of the panorama and/or 3-D model, to define correspondence, or for a variety of other purposes. For instance, to rotate the 3-D model with respect to the panorama, a user may enter a selection with an input device 275 (e.g., press a button) to begin tracking, and then rotate the electronic device 200. The 3-D model may be rotated to coincide with the change in orientation measured by the orientation sensor 295. Further, to define correspondence, a crosshairs or other selection recital may be displayed on the first person view 420. A user may enter a selection with an input device 275 (e.g., press a button) to begin tracking, and then adjust the orientation of the electronic device 200 to move the panorama and 3-D model with respect to the selection recital. After indicating a portion of (e.g., a point in) the 3-D model, the user may further manipulate the orientation of the electronic device 200 to drag to a corresponding portion of (e.g., a point in) the panorama. Further, while it is discussed above that the user may capture their own panorama using a tripod-mounted electronic device, in alternative embodiments, a panorama may have been previously-captured and obtained by the electronic device from a data repository. For example, a panorama may be obtained from stored street-view images provided by an internet-based mapping website, or from some other data source. When a pre-existing panorama is utilized, metadata may be available that indicates at least an approximate position and orientation of the panorama. Such approximate position and orientation may be used as a striating point, from which the above described techniques may be applied to fine tune the position and orientation.

Furthermore, while it is discussed above that a panorama may be used as the representation of the physical environment, it should be understood that any of a variety of other types of representations of the physical environment may alternatively be used, including flat-images, hemispherical images, point clouds, and the like.

Furthermore, it should be understood that the above described techniques may be implemented in software, in hardware, or a combination thereof. A software implementation may include executable instructions that implement applications stored in a non-transitory computer-readable medium, such as a volatile or persistent memory device, a hard-disk, a compact disk (CD), etc. A hardware implementation may include processors, memory chips, programmable logic circuits, application specific integrated circuits, and/or other types of hardware components. Further, a combined software/hardware implementation may include both computer-executable instructions stored in a non-transitory computer-readable medium, as well as one or more hardware components. Accordingly, it should be understood that the above descriptions are meant to be taken only by way of example.

What is claimed is:

1. A method comprising:
   displaying an initialization user interface of an augmented reality application on a display screen of an electronic device, the initialization user interface simultaneously providing multiple views that each show a three-dimensional (3-D) model and an image or point cloud captured of a real-life environment by a camera disposed in the real-life environment, each of the multiple views updated substantially in real-time as a change is made in another of the multiple views, the multiple views including a top-down view that depicts a 3-D model and the image or point cloud of the real-life environment from above, and a first-person view that depicts the 3-D model and the image or point cloud of the real-life environment from a viewpoint immersed within the real-life environment;

receiving, from a user interacting with at least the top-down view of the initialization user interface, an approximate lateral position of the image or point cloud of the real-life environment with respect to the 3-D model;

receiving, from the user interacting with at least the first-person view of the initialization user interface, an approximate orientation of the image or point cloud of the real-life environment with respect to the 3-D model; and determining, based on the approximate lateral position received from the user interacting with at least the top-down view in the initialization user interface and the approximate orientation received from the user interacting with at least the first-person view in the initialization user interface, correspondence between a plurality of portions of the 3-D model and a plurality of corresponding portions of the image or point cloud of the real-life environment to anchor the 3-D model to the image or point cloud of the real-life environment.

2. The method of claim 1, wherein the image or point cloud of the real-life environment is a panorama.

3. The method of claim 1, wherein the image or point cloud of the real-life environment is a point cloud.

4. The method of claim 1, wherein the receiving the approximate orientation further comprises:
receiving a selection of the image or point cloud of the real-life environment within the top-down view from the user via an input device; and
receiving an indication the user has dragged the image or point cloud of the real-life environment within the top-down view to a different lateral position with respect to the 3-D model.

5. The method of claim 1, wherein the receiving the approximate orientation further comprises:
receiving a selection of the 3-D model within the first-person view from the user via an input device; and
receiving an indication the user has dragged the 3-D model within the first-person view to rotate the 3-D model with respect to the image or point cloud of the real-life environment.

6. The method of claim 1, further comprising:
receiving, from the user interacting with at least the first-person view of the initialization user interface, an approximate altitude of the 3-D model with respect to the image or point cloud of the real-life environment.

7. The method of claim 6, wherein the receiving the approximate altitude further comprises:
receiving a selection of the 3-D model within the first-person view from the user via an input device; and
receiving an indication the user has dragged the 3-D model within the first-person view to raise or lower the 3-D model with respect to the image or point cloud of the real-life environment.

8. The method of claim 1, further comprising:
obtaining an indication of lateral position from a position determination sensor; and
using the indication of lateral position as a starting point to which adjustments are received to produce the approximate lateral position.

9. The method of claim 1, further comprising:
obtaining an indication of orientation from an orientation sensor; and
using the indication of orientation as a starting point to which adjustments are received to produce the approximate orientation.

10. The method of claim 1, wherein the determining correspondence further comprises:
receiving selections from the user via an input device of each of the plurality of portions of the 3-D model and the corresponding plurality of portions in the image or point cloud of the real-life environment.

11. The method of claim 1, wherein the image or point cloud of the real-life environment within the top-down view is a projection of the image or point cloud of the real-life environment from above.

12. The method of claim 1, wherein the image or point cloud of the real-life environment was captured at a previous time and is now obtained from a data repository.

13. The method of claim 1, wherein the camera is a part of the electronic device.

14. An apparatus comprising:
a display screen;
a processor; and
a memory coupled to the processor and configured to store instructions for an augmented reality application that are executable on the processor, the instructions for the augmented reality application, when executed, operable to:
cause display of an initialization user interface of the augmented reality application on the display screen, the initialization user interface simultaneously showing multiple views that each show a three-dimensional (3-D) model and an image or point cloud captured of a real-life environment by a camera disposed in the real-life environment, each of the multiple views updated substantially in real-time as a change is made in another of the multiple views, the multiple views including a first view and a second view;
receive, from a user interacting with at least the first view of the initialization user interface, an approximate lateral position of the image or point cloud of the real-life environment with respect to the 3-D model;
receive, from the user interacting with at least the second view of the initialization user interface, an approximate orientation of the image or point cloud of the real-life environment with respect to the 3-D model; and
determine, based on the approximate lateral position received from the user interacting with at least the top-down view in the initialization user interface and the approximate orientation received from the user interacting with at least the first-person view in the initialization user interface, correspondence between a plurality of portions of the 3-D model and a plurality of corresponding portions in the image or point cloud of the real-life environment to anchor the 3-D model to the image or point cloud of the real-life environment.

15. The apparatus of claim 14, wherein the image or point cloud of the real-life environment is a panorama.

16. The apparatus of claim 14, wherein the image or point cloud of the real-life environment is a point cloud.

17. The apparatus of claim 14, wherein the first view is a top-down view that depicts the 3-D model and the image or point cloud of the real-life environment from above, and the second view is a first-person view that depicts the 3-D model and the image or point cloud of the real-life environment from a viewpoint immersed within the real-life environment.

18. A non-transitory computer-readable medium that includes instructions executable on a processor, the instructions, when executed, operable to:
  display an initialization user interface of an augmented reality application, the initialization user interface simultaneously providing multiple views that each show a three-dimensional (3-D) model and an image or point cloud captured of a real-life environment by a camera disposed in the real-life environment, each of the multiple views updated substantially in real-time as a change is made in another of the multiple views, the multiple views including a top-down view and a first-person;
  receive, from a user interacting with the initialization user interface, an approximate lateral position of the image or point cloud of the real-life environment with respect to the 3-D model;
  receive, from the user interacting with the initialization user interface, an approximate orientation of the image or point cloud of the real-life environment with respect to the 3-D model;
  receive, from the user interacting with at least the first-person view of the initialization user interface, indications of correspondence between a plurality of portions of the 3-D model and a plurality of corresponding portions in the image or point cloud of the real-life environment to anchor the 3-D model to the image or point cloud of the real-life environment; and
  determine, based on the approximate lateral position received from the user interacting with at least the top-down view in the initialization user interface and the approximate orientation received from the user interacting with at least the first-person view in the initialization user interface, correspondence between the plurality of portions of the 3-D model and the plurality of corresponding portions in the image or point cloud of the real-life environment.

19. The non-transitory computer-readable medium of claim 18, wherein the image or point cloud of the real-life environment is a panorama.

20. The non-transitory computer-readable medium of claim 18, wherein the instructions, when executed, are further operable to:
  receive, from the user interacting with at least the first-person view of the initialization user interface, an approximate altitude of the 3-D model with respect to the image or point cloud of the real-life environment.

21. A method comprising:
  displaying an initialization user interface of an augmented reality application on a display screen of an electronic device, the initialization user interface simultaneously providing multiple views that each show a three-dimensional (3-D) model and an image or point cloud captured of a real-life environment by a camera disposed in the real-life environment, each of the multiple views updated substantially in real-time as a change is made in another of the multiple views, the multiple views including a top-down view that depicts a 3-D model and the image or point cloud of the real-life environment from above, and a first-person view that depicts the 3-D model and the image or point cloud of the real-life environment from a viewpoint immersed within the real-life environment;
  receiving, from a user interacting with at least the top-down view of the initialization user interface via an input device, a selection of the image or point cloud of the real-life environment within the top-down view and an indication the user has dragged the image or point cloud of the real-life environment within the top-down view to a different lateral position with respect to the 3-D model;
  receiving, from the user interacting with at least the first-person view of the initialization user interface via the input device, a selection of the 3-D model within the first-person view and an indication the user has dragged the 3-D model within the first-person view to rotate or raise or lower the 3-D model with respect to the image or point cloud of the real-life environment; and
  determining, based on the user's selection and indication in the top-down view of the initialization user interface and the user's selection and indication in the first-person view of the initialization user interface, correspondence between a plurality of portions of the 3-D model and a plurality of corresponding portions of the image or point cloud of the real-life environment to anchor the 3-D model to the image or point cloud of the real-life environment.

* * * * *